Aug. 7, 1923.

H. C. REDMOND, SR 1,463,840

FERRULE

Filed Aug. 29, 1922

Inventor
Harry Redmond Sr.

By
Hardway Cathy
Attorneys

Patented Aug. 7, 1923.

1,463,840

UNITED STATES PATENT OFFICE.

HARRY C. REDMOND, SR., OF HOUSTON, TEXAS.

FERRULE.

Application filed August 29, 1922. Serial No. 585,043.

*To all whom it may concern:*

Be it known that I, HARRY C. REDMOND, Sr., citizen of the United States, residing at Houston, in the county of Harris and State of Texas, have invented certain new and useful Improvements in a Ferrule, of which the following is a specification.

This invention relates to new and useful improvements in a ferrule.

One object of the invention is to provide a ferrule specially adapted for use in securing an implement, such as a fork, shovel or the like, to its handle.

Another object of the invention is to provide a ferrule adapted for general use for securing a handle to an implement.

A further feature of the invention resides in the provision of a device of the character described which may be cheaply and easily constructed and readily applied and which is particularly useful in repairing implements that have become loose on their handles.

With the above and other objects in view the invention has particular relation to certain novel features of construction and use, an example of which is given in this specification and illustrated in the accompanying drawings, wherein:—

Figure 2:
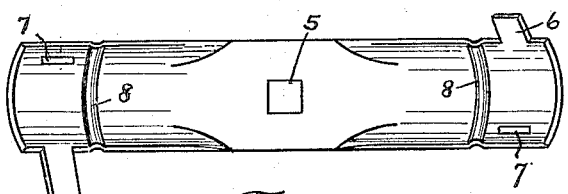
Figure 2 shows an enlarged plan view of the ferrule.
Figure 3:
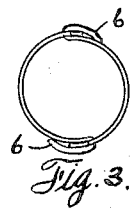
Figure 3 shows an end view thereof.
Figure 5:
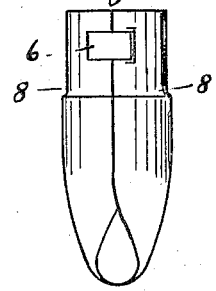
Figure 5 shows an enlarged side view of this type of ferrule.
Figure 1:
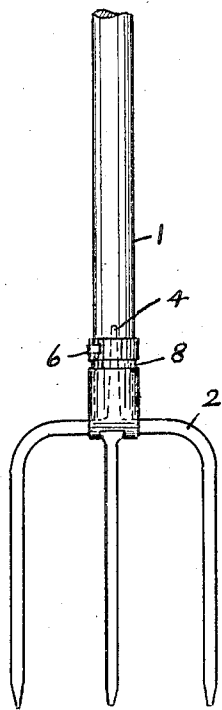
Figure 1 shows a fork with the ferrule applied for securing the same to its handle.

In the drawings the numeral 1 designates a handle, and the numeral 2 designates a three prong fork. This fork has a tang 4 which is driven into the adjacent end of the handle. The ferrule consists of a single piece of sheet metal which is arcuate at its opposite ends and which has a central opening 5 through which the middle prong of the fork is passed. The opposite ends of the ferrule are then fitted up around the adjacent end of the handle. The ends of the ferrule have the tongues 6 and opposing slots 7. When the ends of the ferrule are fitted together around the handle each tongue 6 is passed through the opposing slot 7 and then bent backwardly, as shown in Figures 3 and 5 so as to secure the ferrule in place. Each end of the ferrule has an internal corrugation 8, said corrugations aligning with the ferrule when in position. These corrugations clamp the handle tightly and prevent the ferrule from slipping off the handle and thus securely hold the implement to the handle.

Figure 4:
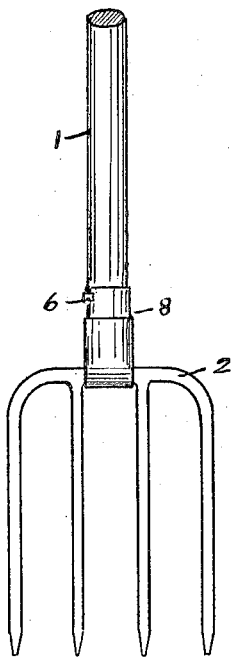
Figure 4 shows a fork secured to its handle by another type of ferrule.

In case a four pronged implement is used the central opening 5 will not be necessary for a reason which is obvious, as shown in Figure 4.

What I claim is:—

1. A ferrule formed of a rectangular strip of sheet metal whose ends are arcuate, each end being formed with a tongue on one side and a slot on the other.

2. A ferrule formed of a rectangular strip of sheet metal whose ends are arcuate, each end being formed with a tongue on one side and a slot on the other, and having a central opening.

3. A ferrule formed of a rectangular strip of sheet metal whose ends are arcuate, each end being formed with a tongue on one side and a slot on the other, and an internal corrugation formed on each end of said strip.

4. A ferrule formed of a strip of metal bent into substantially a U-shaped form and whose ends are arcuate to fit around an implement handle, means for securing said arcuate ends together around said handle and engaging means on the concaved side of each end for gripping said handle.

In testimony whereof I have signed my name to this specification in the presence of two subscribing witnesses.

HARRY C. REDMOND, Sr.

Witnesses:
E. V. HARDWAY,
W. H. DUNLAY.